United States Patent
Egger et al.

(10) Patent No.: US 6,635,107 B2
(45) Date of Patent: Oct. 21, 2003

(54) PIGMENT GRANULATE FOR COLORING BUILDING MATERIALS AND METHOD FOR PRODUCING THE SAME

(75) Inventors: Christian Egger, Pralormo (IT); Klaus Nungess, Neu-Isenburg (DE); Adolf Veit, Wiesbaden (DE); Stefan Volger, Walluf (DE)

(73) Assignee: Brockhues GmbH & Co.KG, Walluf (DE)

( * ) Notice: Subject to any disclaimer, the term of this patent is extended or adjusted under 35 U.S.C. 154(b) by 24 days.

(21) Appl. No.: 09/914,990

(22) PCT Filed: Jan. 16, 2001

(86) PCT No.: PCT/EP01/00432

§ 371 (c)(1),
(2), (4) Date: Dec. 17, 2001

(87) PCT Pub. No.: WO01/53228

PCT Pub. Date: Jul. 26, 2001

(65) Prior Publication Data

US 2002/0185040 A1 Dec. 12, 2002

(30) Foreign Application Priority Data

Jan. 21, 2000 (DE) .......................................... 100 02 559

(51) Int. Cl.[7] .................................................. C09C 1/22
(52) U.S. Cl. ........................ 106/456; 106/457; 106/459; 106/489
(58) Field of Search .................................. 106/456, 457, 106/459, 489

(56) References Cited

U.S. PATENT DOCUMENTS

| | | | | |
|---|---|---|---|---|
| 5,882,395 A | * | 3/1999 | Linde et al. ................. | 106/460 |
| 5,961,710 A | | 10/1999 | Linde et al. | |
| 6,432,196 B1 | * | 8/2002 | Linde et al. ................. | 106/712 |

FOREIGN PATENT DOCUMENTS

| | | |
|---|---|---|
| DE | 29 40 156 A1 | 4/1980 |
| EP | 0 257 423 A2 | 3/1988 |
| EP | 0 418 683 A2 | 3/1991 |
| EP | 0 567 882 A1 | 11/1993 |
| EP | 0 651 031 A1 | 5/1995 |
| WO | WO 97/20892 | 6/1997 |
| WO | WO 01/53228 A1 | 7/2001 |
| WO | WO 01/55264 A2 | 8/2001 |

* cited by examiner

Primary Examiner—C. Melissa Koslow
Assistant Examiner—Shalie Manlove
(74) Attorney, Agent, or Firm—McAndrews, Held & Malloy, Ltd.

(57) ABSTRACT

The invention pertains to pigment granulates for the coloring of building materials and processes to manufacture such granulates. The pigment granulates are granulated from a mixture containing the pigment, at least one wetting agent and/or binder and/or explosive, an agent to reduce the tendency to blister and/or an agent to increase the pigment content in the mixture to be granulated.

20 Claims, No Drawings

PIGMENT GRANULATE FOR COLORING BUILDING MATERIALS AND METHOD FOR PRODUCING THE SAME

The invention pertains to pigment granulate for the coloring of building material and processes for the manufacture of such granulates.

At present, mainly inorganic pigments, especially those based on different iron oxides, are used to color building materials, in particular cement-bound building materials, such as concrete. In this regard pigment granulates exhibit very substantial advantages compared to powders and pastes, e.g. in their handling, in their prevention of dust and the like, but also with respect to their dispersing properties.

The use of aqueous carbon preparations (containing 30 to 80% water) as pearl granulates for coloring in the cement industry is known from DE-A1 29 08 202. This technology cannot be applied to other pigments, and granulates with such water contents are fundamentally disadvantageous, also for applications in the building material field.

The granulation of pigments together with binders through spray granulation is known from DE-A1 29 40 156. Pigment granulates produced in this way are used to manufacture inks, to color plastics, lacquers, and the like. There is no connection to the coloring of building materials, asphalt, and the like.

Color granulates containing more than 5 to 50% by weight of water are known from EP-A2 0 191 278. Granulates with low water contents are not usable for building materials according to this technical theory.

Pigment granulates which can be used to color building materials and which can include other pigments than carbon are described in DE-A1 36 19 363 for the first time. Based on this state of the art, microgranulates are produced from such pigments through mixing with binders and subsequent spray drying. The binders are mainly organic binders, such as lignin sulfonate. These granulates are commercially successful.

Microgranulates without organic binders were proposed in DE-A1 39 18 694. In this specification, inorganic compounds, especially oxides and/or hydroxides and suitable hydrates are used as binders. Such products often exhibit problems in practice because they tend to disperse incompletely when worked into concrete and the like.

EP-A1 0 567 882 describes pelletized, compacted, and sprayed granulates containing binders, such as especially machine oil, wax, paraffin, and the like, which are to be used to color asphalt. In addition to the binders, substances like lignin sulfonate, molasses, starch, and the like can be used. According to this disclosure, substances like lignin sulfonate alone cannot be used as binders.

The compacting of iron oxide pigments with binders under very low molding pressures, in which case line forces of 15 kN/cm are not to be exceeded and densities between 0.5 g/cm$^3$ and 3 g/cm$^3$ are to be set, is known from EP-A1 0 650 939. These lightly compacted powder products are then ground to nuclei and powders, followed by a traditional pelletizing. The compacting stage does not appear to have any detectable influence on the properties of the granulate. In principle, it is a traditional pelletizing. Inorganic or organic substances, primarily oils and the like, are used as binders.

The manufacture of pigment granulates containing lactose as a binder through spray drying with residual moisture of less than 2.5% by weight is known from EP-A1 0 657 511.

In the context of this description, "granulates" means every material whose mean grain size in comparison to the original material has been increased by a treatment stage. Therefore, "granulates" means not only spray granulates and compacting granulates but, for example, also products of a moist treatment with subsequent pulverizing.

On account of their considerable advantages, in comparison to powders, pastes, and the like, granulates have been used for decades on a large scale industrially. Granulation has been accepted for a long time for the processing of pigments as well.

Experience acquired with pigment granulates in other areas cannot simply be transferred to the coloring of building materials, asphalt, and the like. In practice, granulates, which theoretically should be almost perfectly suitable, often prove inadequate because they do not combine all of the required properties.

Although an excellent solidity of the granulate is often achieved, which counteracts its destruction during packaging and transport and restricts the production of dust, on the other hand, its dispersability can be impaired, resulting in the desired homogeneous coloring and the required color intensity not being achieved.

On the other hand, granulates with excellent color intensity and easy dispersability are often too soft and disintegrate even before they are worked into the building material, which can result in increased dust production, in residue in the packaging, in reduced flowability and in correspondingly frequent incorrect dosages.

Of the many methods of granulation, spray granulation has become generally accepted in practice, while, for example, fluidized bed granulation, which is fully comparable theoretically, has not yet produced any usable granulates.

Proposals have recently become known to forego granulates completely and, instead, to use coated powders. WO 97/20892 is given as an example. It remains to be seen whether in this way broad particle size distributions due to clumping can be avoided and whether such coated powders can be used without producing the dust problems typical of the prior art before pigment granulates were introduced.

In order to promote the separation, suspension, and dispersion of pigment granulates, wetting and binding agents are used which are chosen in such a way that the granulate disintegrates with the desired dispersing effect. However, all of the dispersion-promoting wetting and binding mixtures have the disadvantage that they reinforce the tendency to blister, in particular in the case of cement-bound building materials. Regarding the phenomenon of, blistering, certain components of the building material mixture, in the case of concrete or cement above all limestone ($CaCO_3$), travel gradually, for example as a result of weathering, dissolution, or aging of the material, in dissolved form to the surface where they produce, after the solvent has evaporated, an undesirable coating which constantly renews itself.

An essential objective of the invention is to propose, against this background, a process for the coloring of building materials by means of pigment granulates which promotes the coloring by the pigments and at the same time reduces the tendency to blister, especially of cement-bound building materials. Another objective of the invention is to present a process which allows the pigment contents to be increased in the mixture to be granulated.

The features defined in the independent claims achieve this objective.

Advantageous developments are described in the dependent claims.

The objective of the invention is achieved by the pigments, in particular in the form of pigment powder and/or pigment filter cakes, and the traditional wetting and binding agents also being mixed during the manufacture of the pigment granulates with at least one of the agents which reduce the tendency to blister, and/or an agent to increase the pigment content in the mixture to be granulated, it being concluded surprisingly that these latter agents can have a synergistic effect, i.e., the agent to increase the pigment content in the mixture to be granulated reinforces the blister-prevention effect of the respective (other) agents, the inventive process producing an outstanding homogeneity as well as an excellent color intensity.

In accordance with the invention, the agents reducing the tendency to blister are chosen from alkaline earth binding compounds. Preferably, alkaline earth bonding compounds are used which form salts or complexes, especially stable complexes, with alkaline earth ions, which salts or complexes are difficult to dissolve.

In the case of the inventive process, complexing agents include aminopolycarboxylic acids like EDTA, alkane-1,1-diphosphonic acids, polyoxycarboxylic acids, polyamines, crown ether, complexing polymers, and the like. The complexing polymers can be chosen from functionalized polystyrenes, polyacrylates, polyacryl nitriles, polyvinyl alcohols, or polyethyleneimines, which as functional groups exhibit residues of iminodiacetic acid, hydroquinoline, thiourea, guanidine, dithiocarbamate, hydroxamic acid, amidoxime, aminophosphoric acid, cyclical or non-cyclical polyamine, mercaptol, 1,3-dicarbonyl, or crown ethers.

Especially preferred in the inventive process are compounds which form, with alkaline earth ions, salts that are hard to dissolve, like oxine (8-quinolinol), polycarboxylic acids, preferably oxalic acid, or their corresponding salts as well as soaps. In the case of an especially preferred embodiment, soaps are used, for example traditional, commercial salts and of these soft soaps in particular. Soft soaps can include soft soaps and potash soaps. Preferably potash soaps are used, plant-oil-based potash soaps being especially preferred.

In accordance with the invention, in order to increase the solid content, especially of the pigment content, in the mixture to be granulated, agents are used which promote the liquefication of solid pigment following the addition of water as well as the shaping of the granules, especially with spray drying. The latter is especially advantageous if the above-mentioned compounds with surface active properties which reduce the tendency to blister (e.g., soaps) are contained in the mixture to be granulated. This preferred embodiment produces a synergistic effect because both the pigment content in the mixture to be granulated and the shaping of the granulate is promoted overproportionally and the tendency of building-material-bound components to blister is reduced overproportionally. However, the agents to increase the pigment content in the mixture to be granulated can also be used advantageously if no agents which reduce the tendency to blister are used because, for example, in the case of spray drying, the spray costs of the granulate can be reduced substantially through the increase in the proportion of pigment in the sprayed pigment slurry. As well, the agents to reduce the tendency to blister can be used advantageously even if the shaping agents are not used.

The agent increasing the pigment content in the mixture to be granulated can be chosen from compounds which are not lipophilic. Preferably, it can be chosen from mono- or polyhydroxy compounds, mono- or polyhydroxy amine compounds, or carboxylates, or combinations of these compounds.

In the case of the inventive process for the manufacture of pigment granulates, monovalent, primary, secondary, or tertiary, alkyl-substituted or non-substituted alcohols can be used as monohydroxy compounds, such as, for example, 1-propanol, 2-methyl-l-propanol, 2-methyl-2-propanol, and the like. Alcohols from $C_3$ up are preferred. In accordance with the invention, the polyhydroxy compounds used include polyhydric alkyl-substituted or non-substituted alcohols, for example diols, glycols, like ethylene glycol and polyalkylene glycols, glycerine, sugar alcohols, like sorbitol and ionositol, trimethylol propane, and the like. Preferably, 2-methyl-1-propanol and glycols are used in the case of this invention.

Furthermore, the monohydroxyamino compounds used in the inventive process for the manufacture of pigment granulates include monovalent, primary, secondary, or tertiary, alkyl-substituted or non-substituted amino alcohols, such as 2-amino-1-propanol, 2-amino-1-butanol, 3-amino-1-propanol, 2-amino-2-methyl-l-propanol, and the like. Amino alcohols from $C_3$ up are preferred. Polyhydric alkyl-substituted or non-substituted alcohols, such as, for example, 2-amino-2-methyl-1,3-dihydroxypropane, and the like can be used as inventive polyhydroxyamino compounds. Aminoalkyl propanols containing $C_1$ to $C_4$ alkyl residues, especially $C_1$ alkyl residues, such as, for example, 2-amino-2-methyl-l-propanol are used in a preferred embodiment of this invention.

Other compounds with relatively low molecular weights (preferably $C_1$ to $C_{100}$, more preferably $C_2$ to $C_{50}$, most preferably $C_3$ to $C_{25}$), which carry one or more hydrophilic groups, can also be used. These can be —$NH_2$ and —OH, but also ether groups, carboxylic groups, acid functions, and the like, if necessary also in neutralized (salt) form.

The total quantity of the agents to reduce the tendency to blister used in the inventive process for the manufacture of pigment granulates is at least 0.01 percent by weight, preferably 0.05 to 0.5 percent by weight, and more preferably 0.1 to 0.2 percent by weight, based on the total weight of the mixture to be granulated.

The total quantity of the agents to increase the pigment content in the mixture to be granulated used in the inventive process for the manufacture of pigment granulates is at least 0.01 percent by weight, preferably 0.1 to 1 percent by weight, and especially preferred 0.3 to 0.7 percent by weight, based on the total weight of the mixture to be granulated.

In accordance with the invention, the pigment can be mixed as a powder mixture or suspended in a solvent with at least one wetting agent and/or binder and or explosive, an agent to reduce the tendency to blister and/or an agent to increase the pigment content in the mixture to be granulated. Traditional processes, like compression, compacting, pressing, or briquetting, pelletized drying, spray drying, or fluidized bed drying as well as combinations of the aforesaid processes, can be used as granulation processes. Preferably, spray processes (e.g., spraying or fluidized bed drying) are used.

The wetting agent or binder or explosive for this granulate is chosen so that the granulate disintegrates with the desired dispersion effect. Water-soluble wetting agents and binders, like lignin sulfonate in particular, and the like, are especially suitable; binders with an explosive effect or genuine explosives are also suitable. These are mainly heavily hydrophilic polymers with a correspondingly large ability to absorb water, for example certain cellulose derivatives, dextrans, cross-linked polyvinyl pyrrolidone, and the like. Instead or in addition, hydrophilizing agents are used, such as, for example, PEG fatty acid esters and the like. Certain inorganic components, like reactive systems which produce gas when exposed to water, can also be used. Dry binders, like lactose, sugar, and the like, are less preferred, in general, but can be used advantageously for special applications.

An important optional component for inventive granulates is water glass, especially potash water glass, which is added to the aqueous starting mixture for granulation and works as a binder and thickening agent. Preferably, additives in the range below 1 percent by weight (based on the total mixture) are used.

The wetting agent, binder, and/or explosive is chosen in such a way that, when used for coloring, i.e., in the usual aqueous building material mixtures, the granulate becomes suspended and/or is dispersed sufficient quickly and completely. In this regard, the type of pigment, the granulation process, and the secondary processing also play a role, so the mixture suitable in each case is determined through corresponding simple tests.

In accordance with the invention, in all of the aforesaid embodiments of the invention the handling, the working into the building material, the dispersing properties, the color density, and the like can be further influenced advantageously by the surface of the granulate being treated prior to its being mixed with the building materials. In particular, the granulate can be coated with a separating agent and/or a wetting agent. These agents are chosen so that they do no result in clumping and caking of the granulate in the packaging, i.e., they are not too hygroscopic, for example. On the other hand, it is desired that they promote wetting.

The use of granulates during mixing with building materials corresponds to the customary, known procedures.

EXAMPLE 1

A granulate of the invention as made by the inventive process for the coloring of building materials was manufactured in accordance with the following recipe:

| Substance | Percent by weight |
|---|---|
| Fresh water | 32.90 |
| Polyacrylate (40%) | 1.30 |
| Potash water glass | 0.15 |
| Iron oxide red | 65.00 |
| 2-amino-2-methyl-1-propanol | 0.50 |
| Potash soap | 0.15 |
| Sodium hydroxide solution (20%) | |

Building materials colored with pigment granulates manufactured in this manner exhibited an excellent dispersion of the pigment granulates in the building material mixture and, therefore, an outstanding homogeneity as well as a very good color intensity. At the same time they were characterized by an extremely low tendency of components of the building material mixture to blister.

What is claimed is:

1. A pigment granulate for the coloring of building materials manufactured by spray granulation of a mixture comprising a pigment, at least one wetting agent and/or binder and or explosive, an agent to reduce the tendency to blister and/or an agent to increase the pigment content in the mixture to be granulated, and further comprising a soft soap.

2. The granulate of claim 1, wherein the agent to reduce the tendency to blister is an alkaline earth ion-binding compound.

3. The granulate of claim 2, wherein the alkaline earth ion-binding compound is chosen from compounds which produce, with alkaline earth ions, salts which are difficult to dissolve.

4. The granulate of claim 1, wherein the soft soap is a potash soap.

5. The granulate in accordance with one of claim 2, the agent to reduce the tendency to blister being oxalic acid or an oxalate salt.

6. The granulate of claim 1 or 2 wherein the agent to reduce the tendency to blister is a compound which forms complexes with alkaline earth ions.

7. The granulate of claim 2, wherein the total quantity of the agent to reduce the tendency to blister is from 0.05 to 0.5 percent by weight based on the total weight of the mixture to be granulated.

8. The granulate of claim 7, wherein the total quantity of the agent to reduce the tendency to blister is from 0.1 to 0.2 percent by weight based on the total weight of the mixture to be granulated.

9. A pigment granulate for the coloring of building materials manufactured from a mixture comprising a pigment, at least one wetting agent and/or binder and or explosive, an agent to reduce the tendency to blister and/or an agent to increase the pigment content in the mixture to be granulated, and further comprising water glass.

10. The granulate of claim 9, wherein the water glass is a potash water glass.

11. The granulate of claim 9, wherein the quantity of water glass or potash water glass being less than 1 percent by weight based on the total quantity of the mixture to be granulated.

12. The granulate of claim 1, wherein the agent to increase the pigment content in the mixture to be granulated is selected from the group consisting of monohydroxy compounds, polyhydroxy compounds, carboxylates and combinations of these compounds.

13. The granulate of claim 12, wherein the hydroxyamine compound is an aminoalkyl propanol containing $C_1$ to $C_4$ alkyl residues.

14. The granulate of claim 13, wherein the aminoalkyl propanol is an aminoethyl propanol.

15. The granulate of claim 12, wherein the monohydroxy compounds are methyl propanols and the polyhydroxy compounds are glycols.

16. The granulate of claim 1, wherein the total quantity of the agent to increase the pigment content in the mixture to be granulated is from 0.1 to 1 percent by weight based on the total quantity of the mixture to be granulated.

17. The granulate of claim 16, wherein the total quantity of the agent to increase the pigment content in the mixture to be granulated is from 0.3 to 0.7 percent by weight based on the total quantity of the mixture to be granulated.

18. The granulate of claim 1, wherein the pigment includes pigment powder and pigment filter cake.

19. A process to manufacture a granulate of claim 1, comprising mixing the pigment as a powder mixture or as a suspension in a solvent with at least one wetting agent and/or binder and/or explosive, an agent to reduce the tendency to blister and/or an agent to increase the pigment content in the mixture to be granulated.

20. The process in accordance with claim 19, further comprising coating the granulate with a separation agent and/or wetting agent prior to mixing said granulate with the building materials.

* * * * *